June 20, 1961      F. J. SOMES, JR      2,989,579
ELECTRICAL DISTRIBUTION SYSTEM
Filed Feb. 28, 1955
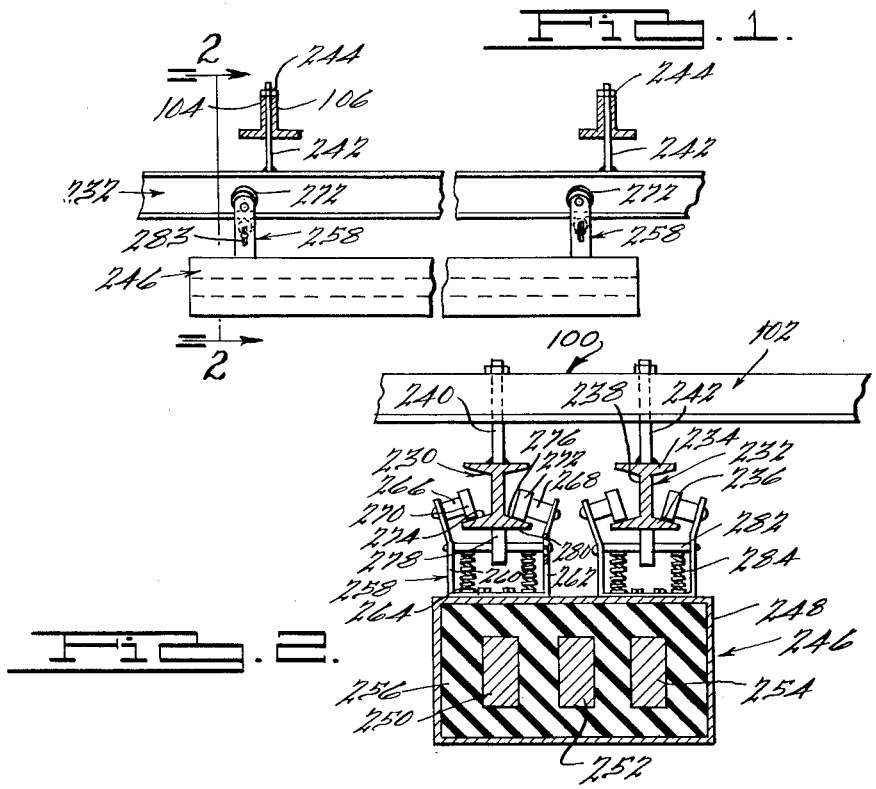
INVENTOR.
Frederick J. Somes, Jr.
BY
Harness, Dickey & Pierce
ATTORNEYS United States Patent Office 2,989,579
Patented June 20, 1961

2,989,579
ELECTRICAL DISTRIBUTION SYSTEM
Frederick J. Somes, Jr., Detroit, Mich., assignor to General Electric Company, a corporation of New York
Filed Feb. 28, 1955, Ser. No. 490,963
2 Claims. (Cl. 174—99)

This invention relates to electrical distribution systems and, more particularly, to an improved electrical system suitable for use with an improved method of installing the same.

An object of the invention is to overcome disadvantages in prior electrical systems and to provide an improved electrical system particularly adapted for relatively large installations.

Another object of the invention is to provide an improved electrical system incorporating improved means which reduces the time, labor and expense required to install the system to a minimum.

Another object of the invention is to provide an improved electrical system that is economical to manufacture, durable, efficient and reliable in operation.

Another object of the invention is to provide an improved electrical system incorporating improved means which facilitates the efficient maintenance of the system with a minimum of labor and expense.

Another object of the invention is to provide an improved electrical system which may be installed in a wide variety of structures of various sizes and types.

Another object of the invention is to provide apparatus usable with an improved method of installing an electrical system which facilitates the rapid installation of relatively large electrical systems with a minimum of equipment, labor and expense.

Still another object of the invention is to provide apparatus usable with an improved method of installing an electrical system which facilitates the installation of an electrical system with a minimum of interference with other equipment or personnel located in the area in which the system is being installed.

The above, as well as other objects and advantages of the present invention, will become apparent from the following description, the appended claims and the accompanying drawings wherein:

FIG. 1 is a fragmentary side elevational view of a portion of an electrical distribution system embodying the invention;

FIG. 2 is a transverse sectional view of the structure illustrated in FIG. 1, taken on the line 2—2 thereof.

The embodiment of the invention illustrated in FIGS. 1 and 2 is particularly adapted for use in bus duct or busway feeder systems. A pair of spaced substantially parallel, generally I-sectioned support rails 230 and 232 are provided, each having spaced substantially parallel flanges 234 and 236 joined by a web 238. The rails 230 and 232 are shown as being suspended from the lower chord 102 of the roof trusses 100 so as to extend transversely thereof, although it will be understood that the rails 230 and 232 may extend in any desired direction with reference to the roof trusses. The rails 230 and 232 are supported by bolts 240 and 242, the lower end portions of which are welded to the top flange 234 of each of the rails at spaced intervals, while the upper end portions of such bolts project through the lower chords of the roof trusses intermediate the angle members 104 and 106, the upper end portions of the bolts being retained by nuts 244.

A bus duct 246 is provided, which includes a plurality of sections joined together in end-to-end relationship to form a unitary structure. The bus duct 246 includes a tubular member 248 that is substantially rectangular in cross section, and a plurality of spaced conductors 250, 252 and 254 are housed in the tubular member 248, the conductors 250, 252 and 254 extending longitudinally of the tubular member and being electrically insulated from each other and from the tubular member, as by the insulation 256. In order to support the bus duct 246 securely and rigidly, a plurality of brackets 258 are provided, the brackets 258 being disposed in pairs at spaced intervals along the bus duct 246. Each of the brackets 258 includes a pair of upwardly projecting spaced flanges 260 and 262 joined by a web 264. The upper end portions of the flanges 260 and 262 project angularly outwardly, as shown in FIG. 2, and carry pins 266 and 268 upon which are mounted rollers 270 and 272 which engage the upper surfaces 274 and 276 of the flanges 236 of each of the rails 230 and 232. In addition, each of the brackets 258 carries a spring-biased roller 278 which engages the lower surface 280 of the flange 236 of each of the rails, the rollers 278 being journaled on pins 282 mounted in slots 283 defined by the flanges 260 and 262 and biased toward the flange 236 by springs 284. Such a construction serves to limit the vertical movement of the bus duct and increases the rigidity of the installation.

In the installation of the invention, the rails 230 and 232 are secured to the roof truss in spaced substantially parallel relationship by the bolts 242. After the rails 230 and 232 have been installed, brackets 258 are fixed to the bus duct 246 in spaced pairs, and the sections of the bus duct are mounted on the rails 230 and 232 so that the rollers 270 and 272 engage the flanges 236 of the rails, the sections of the bus duct being initially mounted on the rails at one end of the proposed line of the bus duct. As the sections of the bus duct 246 are mounted on the rails 230 and 232, adjacent sections of the duct are electrically and mechanically connected together and rolled along the rails toward the distal ends of the rails.

From the above description, it will be apparent that the bus duct 246 is securely and rigidly mounted on the rails and that the installation of both the rails and the bus duct may be effected substantially from one end of the proposed line of the bus duct.

While a preferred embodiment of the invention has been shown and described, it will be understood that various changes and modifications may be made without departing from the spirit of the invention.

What is claimed is:
1. An electrical distribution system comprising an elongate support member having a pair of spaced substantially parallel guideways thereon, means fixed to said support member at spaced intervals and supporting the same in suspended relation, an electrical bus duct comprising a plurality of bus duct sections each including an elongate generally tubular rigid housing of metallic material and a plurality of longitudinally extending parallel busbar conductors supported in insulated relation in said housing, means mechanically connecting said housings together in end-to-end relation, means electrically and mechanically connecting corresponding busbar conductors of said bus duct sections in series, a pair of generally U-shaped support brackets fixed to each of said bus duct housings in longitudinally spaced arrangement, each of said brackets including a pair of spaced upstanding side portions integrally joined by a bight portion, the bight of each of said brackets being fixed to said bus duct housing, and a guide roller carried by each of said upstanding side portions and engaging said guideways, said bus duct thereby being suspended for longitudinal rolling movement as a whole along said support member.

2. An electric power distribution system comprising a pair of spaced substantially parallel elongate support members, each having a pair of spaced guideways thereon, means fixed to said support members at spaced intervals and supporting the same in suspended relation, an electrical bus duct comprising a plurality of elongate bus duct sections each including an elongate generally tubular rigid housing of metallic material and a plurality of longitudinally extending busbar conductors supported in insulated relation therein, means mechanically connecting said housings together in end-to-end relation, means electrically and mechanically connecting corresponding busbar conductors of said bus duct sections in electrical series relation, at least one pair of generally U-shaped brackets fixed to each of said bus duct housings in side-by-side relation transversely of said housing, each of said brackets having a pair of spaced upstanding side portions integrally connected by a bight portion, the bight portion of each of said brackets being fixed to said bus duct housing, and a guide roller carried by each of said side portions and engaging a corresponding guide way on one of said elongate support members, said bus duct thereby being suspended from said support members while permitting longitudinal rolling movement of said bus duct system as a whole longitudinally along said support members.

References Cited in the file of this patent

UNITED STATES PATENTS

| | | |
|---|---|---|
| 1,683,578 | Mobius et al. | Sept. 4, 1928 |
| 1,921,109 | Webb et al. | Aug. 8, 1933 |
| 1,923,741 | Murdock et al. | Aug. 22, 1933 |
| 2,026,884 | Glasgow | Jan. 7, 1936 |
| 2,058,804 | Knies | Oct. 27, 1936 |
| 2,291,490 | Naysmith | July 28, 1942 |
| 2,350,601 | Frank et al. | June 6, 1944 |
| 2,400,223 | Cole et al. | May 14, 1946 |
| 2,430,451 | Carr et al. | Nov. 11, 1947 |
| 2,443,371 | Barner | June 15, 1948 |
| 2,571,832 | Chapin | Oct. 16, 1951 |
| 2,579,487 | Frankwich | Dec. 25, 1951 |
| 2,625,646 | Goebel | Jan. 13, 1953 |
| 2,626,298 | Hammerly | Jan. 20, 1953 |
| 2,626,301 | Hammerly | Jan. 20, 1953 |
| 2,646,872 | Daigle | July 28, 1953 |
| 2,728,819 | Hauss | Dec. 27, 1955 |
| 2,775,643 | Scott | Dec. 25, 1956 |
| 2,796,459 | Schymik | June 18, 1957 |
| 2,803,741 | Guth | Aug. 20, 1957 |
| 2,818,497 | Alden | Dec. 31, 1957 |

FOREIGN PATENTS

| | | |
|---|---|---|
| 563,733 | Great Britain | Aug. 28, 1944 |
| 634,867 | Great Britain | Mar. 29, 1950 |
| 867,473 | Germany | Feb. 19, 1953 |